United States Patent
Nagayasu

(10) Patent No.: US 12,459,302 B2
(45) Date of Patent: Nov. 4, 2025

(54) PNEUMATIC TIRE

(71) Applicant: The Yokohama Rubber Co., LTD., Tokyo (JP)

(72) Inventor: Masaaki Nagayasu, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 1114 days.

(21) Appl. No.: 17/270,212

(22) PCT Filed: Aug. 22, 2019

(86) PCT No.: PCT/JP2019/032805
§ 371 (c)(1),
(2) Date: Feb. 22, 2021

(87) PCT Pub. No.: WO2020/045223
PCT Pub. Date: Mar. 5, 2020

(65) Prior Publication Data
US 2021/0323356 A1    Oct. 21, 2021

(30) Foreign Application Priority Data
Aug. 29, 2018  (JP) .................. 2018-160443

(51) Int. Cl.
 *B60C 11/12* (2006.01)
(52) U.S. Cl.
 CPC ...... *B60C 11/1259* (2013.01); *B60C 11/1204* (2013.01); *B60C 11/1236* (2013.01); *B60C 2011/1213* (2013.01); *B60C 2011/1268* (2013.01)

(58) Field of Classification Search
 CPC . B60C 11/1259; B60C 11/12; B60C 11/1236; B60C 2011/1268
 See application file for complete search history.

(56) References Cited

U.S. PATENT DOCUMENTS 5,327,953 A * 7/1994 Ichiki ................ B29D 30/0606
152/902
2005/0150582 A1    7/2005 Matsumura

FOREIGN PATENT DOCUMENTS

| CA | 2064932 A1 * | 10/1992 | ............. B60C 11/11 |
|---|---|---|---|
| CA | 2074147 A | 1/1993 | |
| CN | 1636770 A | 7/2005 | |
| EP | 524010 A1 | 1/1993 | |

(Continued)

*Primary Examiner* — Justin R Fischer
*Assistant Examiner* — Philip N Schwartz
(74) *Attorney, Agent, or Firm* — Thorpe North & Western

(57) ABSTRACT

A pneumatic tire includes a tread portion molded by sectors divided in a tire circumferential direction. The pneumatic tire includes circumferential grooves, rows of land portions, and sipes. The circumferential grooves extend in the tire circumferential direction in the tread portion. The rows of land portions are defined by the circumferential grooves. The sipes extend in a tire width direction in at least one row of the rows of land portions. The sipes include at least one shallow bottom sipe and regular sipes. The at least one shallow bottom sipe is disposed in a boundary region including a dividing position of each of the sectors. The regular sipes are disposed at positions more separated from the dividing position of each of the sectors than the at least one shallow bottom sipe. The at least one shallow bottom sipe is shallower than the regular sipes.

5 Claims, 3 Drawing Sheets

(56) References Cited

FOREIGN PATENT DOCUMENTS

| | | | |
|---|---|---|---|
| ES | 2075628 | T | 10/1995 |
| FI | 923257 | A | 1/1993 |
| JP | 5-24417 | A | 2/1993 |
| JP | 9-39116 | A | 2/1997 |
| JP | 11-48714 | A | 2/1999 |
| JP | 2002-292640 | A | 10/2002 |
| JP | 3494511 | B | 2/2004 |
| JP | 2005-193858 | A | 7/2005 |
| JP | 2009-255734 | A | 11/2009 |
| JP | 4411975 | B | 2/2010 |
| JP | 2011-245903 | A | 12/2011 |
| NO | 175297 | B | 6/1994 |

\* cited by examiner

PNEUMATIC TIRE

TECHNICAL FIELD

The present technology relates to a pneumatic tire and particularly relates to a pneumatic tire that allows enhancing braking performance on wet road surfaces and snow-covered road surfaces without changing an appearance of the tire, and reducing poor appearance.

BACKGROUND ART

When a pneumatic tire having a plurality of sipes in a tread portion is vulcanized and molded, there is a problem that a tire mold and a tread rubber are bonded and poor appearance occurs in the vulcanized pneumatic tire. Such a bonding between the tire mold and the tread rubber is significant in winter tires in which a large number of sipes are disposed in a tread portion. In contrast, it has been proposed to reduce the number of sipes in a boundary region including a divided position of a sector and shorten a length of a sipe in a tire width direction (for example, see Japan Patent Nos. 3494511 and 4411975).

However, reducing the number of sipes and shortening the length in the tire width direction not only changes the appearance of the tire, but also causes a problem that braking performance on wet road surfaces and snow-covered road surfaces based on the sipes cannot be sufficiently obtained.

SUMMARY

The present technology provides a pneumatic tire that allows enhancing braking performance on wet road surfaces and snow-covered road surfaces without changing an appearance of the tire, and reducing poor appearance.

A pneumatic tire includes a tread portion molded by a plurality of sectors divided in a tire circumferential direction. The pneumatic tire includes a plurality of circumferential grooves, a plurality of rows of land portions, and a plurality of sipes. The plurality of circumferential grooves extend in the tire circumferential direction in the tread portion. The plurality of rows of land portions are defined by the plurality of circumferential grooves. The plurality of sipes extend in a tire width direction in at least one row of the plurality of rows of land portions. The plurality of sipes include at least one shallow bottom sipe and a plurality of regular sipes. The at least one shallow bottom sipe is disposed in a boundary region including a dividing position of each of the plurality of sectors. The plurality of regular sipes are disposed at positions more separated from the dividing position of each of the plurality of sectors than the at least one shallow bottom sipe. The at least one shallow bottom sipe is shallower than the plurality of regular sipes.

In the embodiment of the present technology, the pneumatic tire includes the plurality of circumferential grooves, the plurality of rows of land portions, and the plurality of sipes. The circumferential grooves extend in the tire circumferential direction in the tread portion. The land portions are defined by the circumferential grooves. The sipes extend in the tire width direction in at least one row of the land portion. The tread portion is molded by the plurality of sectors divided in the tire circumferential direction. The sipes include at least one shallow bottom sipe and the plurality of regular sipes. The shallow bottom sipe is disposed in the boundary region including the dividing position of the sector. The regular sipes are disposed at the positions more separated from the dividing position of the sector than the shallow bottom sipe. The shallow bottom sipe is shallower than the regular sipe. Thus, while braking performance on wet road surfaces and snow-covered road surfaces is enhanced based on the sipes, bonding between a tire mold and a tread rubber can be suppressed based on the shallow bottom sipes in the boundary region, and poor appearance can be reduced. Additionally, by providing the shallow bottom sipes in the boundary region and changing the depth of the sipes, the appearance of the tire is not changed.

In the embodiment of the present technology, the boundary region is preferably a region within 15 mm on one side in the tire circumferential direction with the dividing position of each of the plurality of sectors as a center. As a result, poor appearance can be effectively suppressed while the braking performance on wet road surfaces and snow-covered road surfaces is effectively enhanced.

In the embodiment of the present technology, the at least one shallow bottom sipe preferably has a depth in a range of from 30% to 80% to an average maximum depth of the plurality of regular sipes in each of the plurality of rows of land portions including the at least one shallow bottom sipe. As a result, the bonding between the tire mold and the tread rubber can be effectively suppressed while the braking performance on wet road surfaces and snow-covered road surfaces is effectively enhanced.

In the embodiment of the present technology, the shallow bottom sipes are preferably disposed most in each of the plurality of rows of land portions located on an outer side in the tire width direction among the plurality of rows of land portions in the tread portion. As a result, a mold release property of the sipes can be enhanced, and the bonding between the tire mold and the tread rubber can be effectively suppressed.

In the embodiment of the present technology, an inclination angle of each of the plurality of sipes with respect to the dividing line of each of the plurality of sectors is defined as θ, the number of the shallow bottom sipes that satisfy $0°≤θ≤30°$ is preferably larger than the number of the shallow bottom sipes that do not satisfy $0°≤θ≤30°$. As a result, the bonding between the tire mold and the tread rubber can be effectively suppressed.

DETAILED DESCRIPTION

Figure 1:
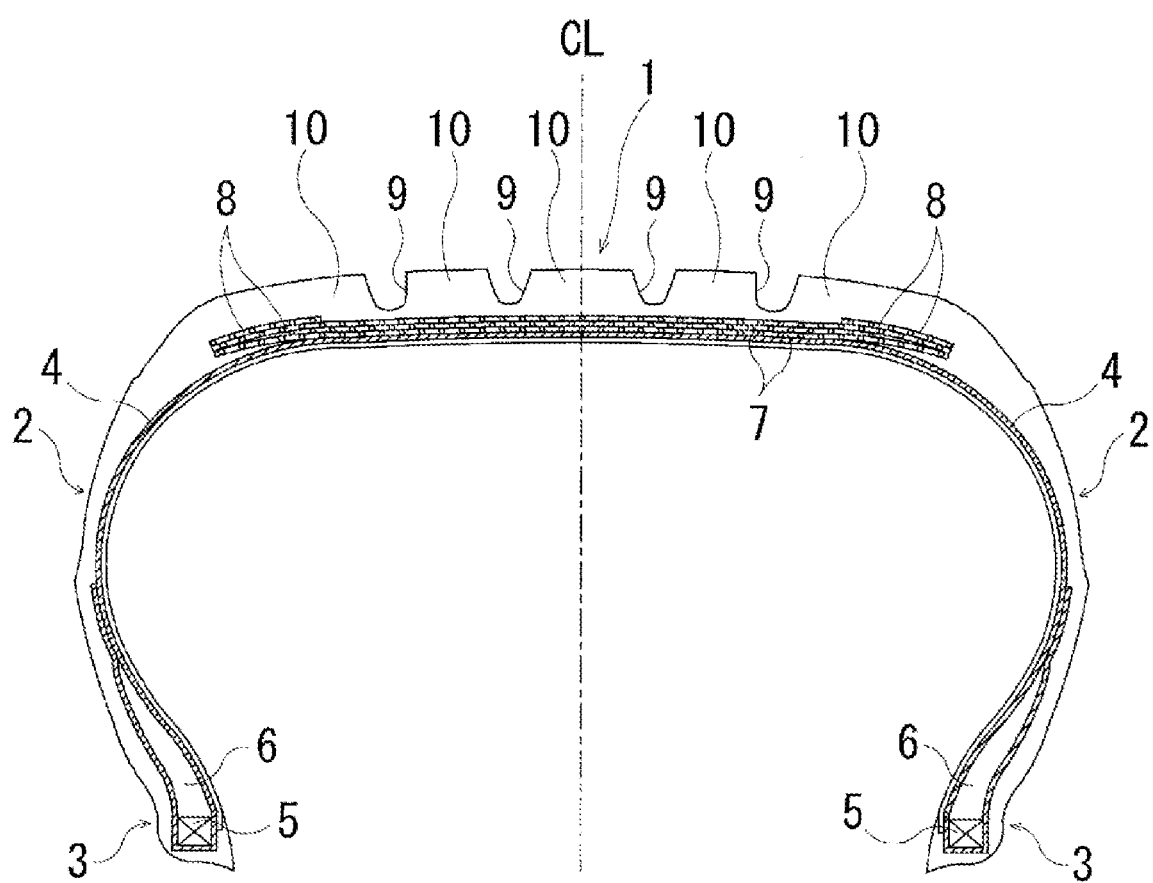
FIG. 1 is a meridian cross-sectional view illustrating a pneumatic tire according to an embodiment of the present technology.
Figure 2:
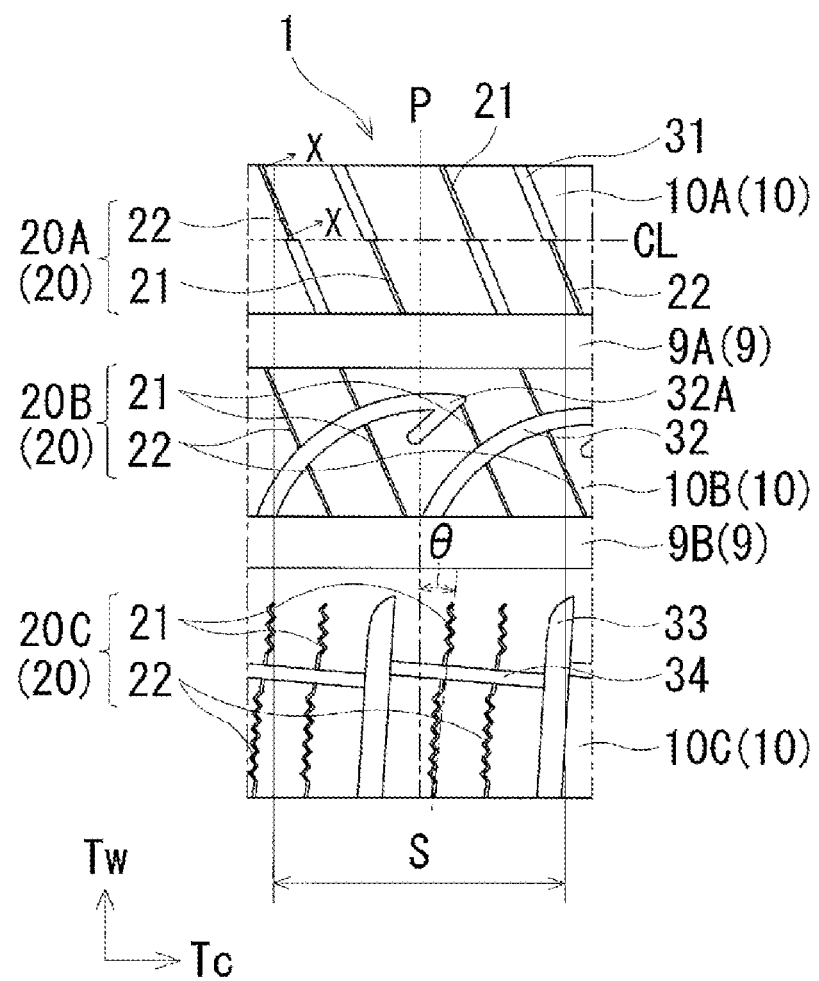
FIG. 2 is a plan view illustrating a tread portion of the pneumatic tire according to an embodiment of the present technology.

Configurations of embodiments of the present technology will be described in detail below with reference to the accompanying drawings. FIGS. 1 and 2 illustrate a pneumatic tire according to an embodiment of the present technology. In FIG. 2, Tc indicates a tire circumferential direction and Tw indicates a tire width direction.

As illustrated in FIG. 1, a pneumatic tire according to an embodiment of the present technology includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on the outer circumferential side of the carcass layer 4 in the tread portion 1. The belt layers 7 each include a plurality of reinforcing cords that are inclined with respect to the tire circumferential direction, the reinforcing cords being disposed between layers in a criss-cross manner. In the belt layers 7, the inclination angle of the reinforcing cords with respect to the tire circumferential direction falls within a range of from 10° to 40°, for example. Steel cords are preferably used as the reinforcing cords of the belt layers 7. To improve high-speed durability, at least one belt cover layer 8, formed by arranging reinforcing cords at an angle of, for example, not larger than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto.

The pneumatic tire is vulcanized and molded using a sectional tire mold. The tire mold includes an annular side mold for molding the tread portion 1, and the side mold includes sectors plurally divided along the tire circumferential direction. The sectors divided into 7 to 11 in the tire circumferential direction are usually used. As illustrated in FIG. 2, the tread portion 1 has a dividing position P of the sector, and includes a boundary region S including the dividing position P of the sector. The boundary region S is a region having a predetermined length on both sides in the tire circumferential direction with the dividing position P of the sector as its center.

Four circumferential grooves 9 extending in the tire circumferential direction are formed in the tread portion 1. The circumferential grooves 9 includes a pair of inner circumferential grooves 9A located on both sides of a tire center line CL and a pair of outer circumferential grooves 9B located on the outermost side in the tire width direction. Land portions 10 are defined by the four circumferential grooves 9 in the tread portion 1. The land portions 10 include a center land portion 10A located on the tire center line CL, a pair of intermediate land portions 10B located on the outer side of the center land portion 10A in the tire width direction, and a pair of shoulder land portions 10C located on the outer side of the respective intermediate land portions 10B in the tire width direction. A plurality of sipes 20 extending in the tire width direction are formed in at least one row of the land portion 10 of the land portions 10A to 10C. The sipes 20 can be formed in a linear or zigzag-like manner on a road contact surface of the tread portion 1. The sipes 20 are narrow grooves having a groove width of 1.5 mm or less.

More specifically, a plurality of sipes 20A and a plurality of narrow grooves 31, which are inclined in the same direction with respect to the tire width direction, are disposed at intervals in the tire circumferential direction in the center land portion 10A. One end of the sipe 20A communicates with the inner circumferential groove 9A, and the other end communicates with the narrow groove 31. On the other hand, the narrow groove 31 is a groove having a larger groove width than that of the sipe 20A. One end of the narrow groove 31 communicates with the inner circumferential groove 9A, and the other end communicates with the sipe 20A. The sipes 20A and the narrow grooves 31 are disposed alternately in the tire circumferential direction such that the narrow grooves 31 are disposed in a staggered manner in the tire circumferential direction as a whole of the center land portion 10A.

A plurality of lug grooves 32 inclined in the same direction with respect to the tire width direction are disposed at intervals in the tire circumferential direction in the intermediate land portion 10B. While one end of the lug groove 32 opens to the outer circumferential groove 9B, the other end terminates within the intermediate land portion 10B. The lug groove 32 includes a bent portion 32A formed in an acute angle manner at a midway position between the one end and the other end. A plurality of sipes 20B extending in a direction intersecting with the lug grooves 32 are disposed at intervals in the tire circumferential direction. The sipes 20B are divided into a plurality of portions by intersecting with the lug grooves 32, and the divided portions are disposed on the same straight lines. At least one end of the sipe 20B communicates with the outer circumferential groove 9B.

A plurality of lug grooves 33 inclined in the same direction with respect to the tire width direction are disposed at intervals in the tire circumferential direction in the shoulder land portion 10C. The lug grooves 33 do not communicate with the outer circumferential groove 9B. A plurality of narrow grooves 34 that communicate with the lug grooves 33 and extend in the tire circumferential direction are formed. A plurality of sipes 20C inclined in the same direction with respect to the tire width direction are disposed at intervals in the tire circumferential direction. The sipes 20C do not communicate with the outer circumferential groove 9B. The sipes 20C are divided into a plurality of portions by intersecting with the narrow grooves 34, and the divided portions are disposed on the same straight lines.

The sipe 20 (sipes 20A to 20C) described above includes at least one shallow bottom sipe 21 and a plurality of regular sipes 22. In other words, all of the sipes 20 excluding the shallow bottom sipe 21 are the regular sipes 22. The shallow bottom sipes 21 are disposed nearest to the dividing position P of the sector on both the respective sides of the dividing position P of the sector in the tire circumferential direction. The regular sipes 22 are disposed at positions more separated from the dividing position P of the sector than the shallow bottom sipes 21.

Figure 3:
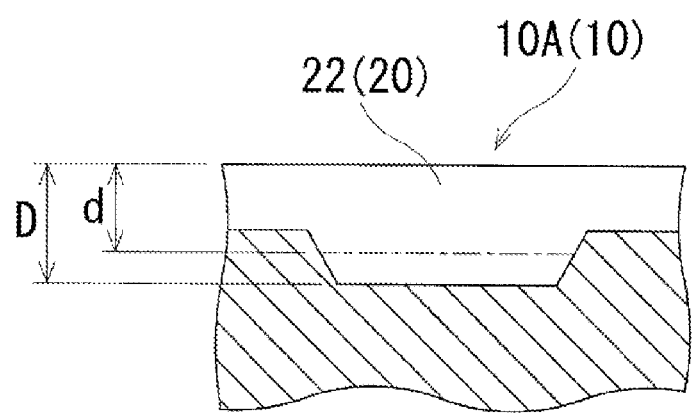
FIG. 3 is a cross-sectional view taken along X-X in the direction of the arrow in FIG. 2.

The bottom of the shallow bottom sipe 21 is raised. Therefore, as illustrated in FIG. 3, a depth d of the shallow bottom sipe 21 is shallower than a depth D of the regular sipe 22. The shallow bottom sipe 21 shallower than the regular sipe 22 means that the shallow bottom sipe 21 is shallower than the average maximum depth of the regular sipe 22 in the land portion 10 including the shallow bottom sipe 21. The average maximum depth of the regular sipe 22 is found by averaging the maximum depths of the regular sipes 22 included in the land portions 10 in the entire circumference of the tire. Note that when the sipe 20 has a plurality of step portions as illustrated in FIG. 3, the depth (maximum depth) from the road contact surface of the tread portion 1 to the lowest step is measured as the depth of the sipe 20.

The pneumatic tire described above includes the plurality of circumferential grooves 9, the plurality of rows of the land portions 10, and the plurality of sipes 20. The circumferential grooves 9 extend in the tire circumferential direction in the tread portion 1. The land portions 10 are defined by the circumferential grooves 9. The sipes 20 extend in the tire width direction in at least one row of the land portion 10. The tread portion 1 is molded by the plurality of sectors divided in the tire circumferential direction. The sipes 20 include at least one shallow bottom sipe 21 and the plurality of regular sipes 22. The shallow bottom sipe 21 is disposed in the boundary region S including the dividing position P of the sector. The regular sipes 22 are disposed at the positions more separated from the dividing position P of the sector than the shallow bottom sipe 21. The shallow bottom sipe 21 is shallower than the regular sipe 22. Thus, while the braking performance on wet road surfaces and snow-covered road surfaces are enhanced based on the sipes 20, the bonding between the tire mold and the tread rubber can be suppressed based on the shallow bottom sipes 21 in the boundary region S, and poor appearance can be reduced. Additionally, by providing the shallow bottom sipes 21 in the boundary region S and changing the depth of the sipes 20, the appearance of the tire is not changed. Furthermore, this also contributes to enhancing the uniformity of the pneumatic tire.

In the pneumatic tire, the boundary region S is preferably a region within 15 mm on one side in the tire circumferential direction with the dividing position P of the sector as its center, and more preferably a region within 10 mm on one side. By appropriately setting the boundary region S where the shallow bottom sipe 21 is disposed in this manner, poor appearance can be effectively suppressed while the braking performance on wet road surfaces and snow-covered road surfaces is effectively enhanced.

The depth of the shallow bottom sipe 21 is preferably in the range of from 30% to 80% to the average maximum depth of the regular sipe 22 in the land portion 10 including the shallow bottom sipe 21, and more preferably in the range of from 40% to 60%. Appropriately setting the depth of the shallow bottom sipe 21 to the average maximum depth of the regular sipe 22 in this manner makes it possible to effectively suppress the bonding between the tire mold and the tread rubber while the braking performance on wet road surfaces and snow-covered road surfaces is effectively enhanced. Here, the ratio of the depth of the shallow bottom sipe 21 to the average maximum depth of the regular sipe 22 of less than 30% increases an occurrence rate of poor appearance. Conversely, the ratio in excess of 80% cannot sufficiently obtain the effect of enhancing the braking performance on wet road surfaces and snow-covered road surfaces.

In particular, the shallow bottom sipes 21 are preferably disposed most in the land portions located on the outer side in the tire width direction among the land portions 10 in the tread portion 1. In the case of the land portions 10A to 10C illustrated in FIG. 2, the land portion 10 located on the outer side in the tire width direction refers to the shoulder land portion 10C located on the outermost side in the tire width direction. The bonding between the tire mold and the tread rubber is likely to occur in the shoulder land portion. Accordingly, by disposing the shallow bottom sipes 21 mostly in the land portion 10 located on the outer side in the tire width direction, the mold release property of the sipes 20 can be enhanced, and the bonding between the tire mold and the tread rubber can be effectively suppressed.

An inclination angle of the sipe 20 with respect to the dividing line of the sector is defined as θ (see FIG. 2). The inclination angle θ of the sipe 20 is an angle formed by a straight line connecting groove width center positions of both ends in a longitudinal direction of the sipe 20 and the dividing line of the sector. At this time, the number of the shallow bottom sipes 21 that satisfy $0° \leq \theta \leq 30°$ is preferably larger than the number of the shallow bottom sipes 21 that do not satisfy $0° \leq \theta \leq 30°$. In particular, the number of the shallow bottom sipes 21 that satisfy $0° \leq \theta \leq 15°$ is more preferably larger than the number of the shallow bottom sipes 21 that do not satisfy $0° \leq \theta \leq 15°$. The closer to substantially parallel the sipes are disposed to the dividing line of the sector, the less likely the bonding between the tire mold and the tread rubber occurs. Accordingly, relatively increasing the shallow bottom sipes 21 satisfying the relationship of the inclination angle θ allows effectively suppressing the bonding between the tire mold and the tread rubber. Note that in FIG. 2, the dividing position of the sector is parallel to the tire width direction.

While the embodiment of FIG. 2 illustrates an example in which the shallow bottom sipes 21 are provided on both sides of the dividing position P of the sector in the tire circumferential direction. However, the shallow bottom sipe 21 may be provided on only one side of the dividing position P of the sector in the tire circumferential direction. Additionally, while an example in which the shallow bottom sipes 21 are disposed at the positions separated from the dividing position P of the sector is illustrated, the shallow bottom sipes 21 may be disposed on the dividing position P of the sector. In the embodiment of the present technology, even when the shallow bottom sipe 21 is disposed across the dividing position P of the sector, the bonding between the tire mold and the tread rubber can be suppressed based on the shallow bottom sipe 21 in the boundary region S.

In the embodiment of the present technology, it is sufficient that the shallow bottom sipe 21 is disposed to at least one dividing position P on the tire circumference, and the shallow bottom sipes 21 need not to be disposed to the dividing positions P of all sectors on the tire circumference. Additionally, it is sufficient that shallow bottom sipe 21 is disposed in at least one row of the land portion 10 in the tread portion 1, and the shallow bottom sipes 21 need not to be disposed in all land portions 10 in the tread portion 1.

Although the tire to which the sipe structure according to the embodiment of the present technology is applied is not particularly limited, an application to a winter tire having a large number of sipes provides a significant effect of suppressing the bonding between the tire mold and the tread rubber, in addition to an effect of enhancing the braking performance on wet road surfaces and snow-covered road surfaces.

EXAMPLE

In a pneumatic tire having a tire size of 205/55R16 that includes a plurality of circumferential grooves extending in a tire circumferential direction in a tread portion, a plurality of rows of land portions defined by the circumferential grooves, a plurality of sipes extending in a tire width direction in at least one row of the land portion, and the tread portion molded by a plurality of sectors divided in the tire circumferential direction, the presence of the sipe in a boundary region, the presence of a shallow bottom sipe, the range of the boundary region, the proportion of raised bottom of the shallow bottom sipe, the comparison of the number of the shallow bottom sipes in each land portion, the inclination angle θ of the sipe in the center land portion, the inclination angle θ of the sipe in the intermediate land portion, and the inclination angle θ of the sipe in the shoulder land portion were set as in Table 1, and tires of Conventional Example, Comparative Example, and Examples 1 to 7 were manufactured.

Note that the tire of Conventional Example has the reduced number of sipes in the boundary region, and structures without the sipes are disposed in the boundary region. The tire of Comparative Example has a structure in which the shallow bottom sipes are not disposed in the boundary region, and only regular sipes are disposed.

In Table 1, the range of the boundary region indicates a distance to one side in the tire circumferential direction with the dividing line of the sector as its center. The proportion of raised bottom of the shallow bottom sipe is the proportion of the depth of the shallow bottom sipe to the average maximum depth of the regular sipe in the land portion including the shallow bottom sipe. In the comparison of the numbers of shallow bottom sipes in the respective land portions, "Equivalent" means that the numbers of the shallow bottom sipes disposed in the respective land portions are the same, "Shoulder land portion" or "Intermediate land portion" means that the land portion has the largest number of shallow bottom sipes.

These test tires were evaluated for the braking performance on wet road surfaces, the braking performance on snow-covered road surfaces, and a poor appearance occurrence rate by the following test methods. Table 1 shows the results.

Braking Performance on Wet Road Surfaces:

The test tires were each mounted on a wheel with a rim size of 16×7 J, inflated to an air pressure of 230 kPa, and mounted on a test vehicle having an engine displacement of 2000 cc. Braking was performed from a traveling condition at a speed of 40 km/h on wet road surfaces, and a braking distance until the vehicle came to a complete stop was measured. The evaluation results were expressed, using the reciprocal of the measurement values, as index values with the value of the Conventional Example being defined as 100. Larger index values indicate superior braking performance on wet road surfaces.

Braking Performance on Snow-Covered Road Surfaces:

The test tires were each mounted on a wheel with a rim size of 16×7 J, inflated to an air pressure of 230 kPa, and mounted on a test vehicle having an engine displacement of 2000 cc. Braking was performed from a traveling condition at a speed of 40 km/h on snow-covered road surfaces, and a braking distance until the vehicle came to a complete stop was measured. The evaluation results were expressed, using the reciprocal of the measurement values, as index values with the value of the Conventional Example being defined as 100. Larger index values indicate superior braking performance on snow-covered road surfaces.

Poor Appearance Occurrence Rate:

1000 of each of the test tires were manufactured, chips and cracks of the land portion in each boundary region on the tire circumference were visually confirmed, and the number of boundary regions where the chips and the cracks occurred was counted. The evaluation results show the proportion of the number of boundary regions where chips and cracks occurred in each of the test tires. Larger proportions indicate a superior suppressing effect on poor appearance.

TABLE 1-1

|  | Conventional Example | Comparative Example | Example 1 |
|---|---|---|---|
| Presence of sipe in boundary region | No | Yes | Yes |
| Presence of shallow bottom sipe | No | No | Yes |
| Range of boundary region (mm) | 10 | 10 | 10 |
| Proportion of raised bottom of shallow bottom sipe (%) | — | — | 50 |
| Comparison of the number of shallow bottom sipes in each land portion | — | — | Equivalent |
| Inclination angle θ of sipe in center land portion (deg) | 35° | 35° | 35° |
| Inclination angle θ of sipe in intermediate land portion (deg) | 35° | 35° | 35° |
| Inclination angle θ of sipe in shoulder land portion (deg) | 35° | 35° | 35° |
| Steering stability performance on wet road surfaces | 100 | 110 | 110 |
| Steering stability performance on snow-covered road surfaces | 100 | 110 | 110 |
| Poor appearance occurrence rate (%) | 0.05 | 0.5 | 0.1 |

TABLE 1-2

|  | Example 2 | Example 3 | Example 4 |
|---|---|---|---|
| Presence of sipe in boundary region | Yes | Yes | Yes |
| Presence of shallow bottom sipe | Yes | Yes | Yes |
| Range of boundary region (mm) | 20 | 10 | 10 |
| Proportion of raised bottom of shallow bottom sipe (%) | 50 | 20 | 90 |
| Comparison of the number of shallow bottom sipes in each land portion | Equivalent | Equivalent | Equivalent |
| Inclination angle θ of sipe in center land portion (deg) | 35° | 35° | 35° |
| Inclination angle θ of sipe in intermediate land portion (deg) | 35° | 35° | 35° |
| Inclination angle θ of sipe in shoulder land portion (deg) | 35° | 35° | 35° |
| Steering stability performance on wet road surfaces | 105 | 110 | 105 |
| Steering stability performance on snow-covered road surfaces | 105 | 110 | 105 |
| Poor appearance occurrence rate (%) | 0.1 | 0.2 | 0.1 |

TABLE 1-3

|  | Example 5 | Example 6 | Example 7 |
|---|---|---|---|
| Presence of sipe in boundary region | Yes | Yes | Yes |
| Presence of shallow bottom sipe | Yes | Yes | Yes |
| Range of boundary region (mm) | 10 | 10 | 10 |
| Proportion of raised bottom of shallow bottom sipe (%) | 50 | 50 | 50 |
| Comparison of the number of shallow bottom sipes in each land portion | Shoulder land portion | Shoulder land portion | Intermediate land portion |
| Inclination angle θ of sipe in center land portion (deg) | 35° | 35° | 35° |
| Inclination angle θ of sipe in intermediate land portion (deg) | 35° | 35° | 10° |
| Inclination angle θ of sipe in shoulder land portion (deg) | 35° | 10° | 35° |
| Steering stability performance on wet road surfaces | 110 | 115 | 110 |
| Steering stability performance on snow-covered road surfaces | 110 | 115 | 110 |
| Poor appearance occurrence rate (%) | 0.01 | 0.005 | 0.01 |

As can be seen from Table 1, the tires of Examples 1 to 7 enhanced the braking performance on wet road surfaces, the braking performance on snow-covered road surfaces, and the poor appearance occurrence rate in a well-balanced manner as compared to those of Conventional Example.

On the other hand, since Comparative Example has the structure in which the shallow bottom sipe is not provided in the boundary region but only the regular sipe is present, the effect of enhancing the poor appearance occurrence rate was not able to be sufficiently obtained, and the braking performance on wet road surfaces, the braking performance on snow-covered road surfaces, and the poor appearance occurrence rate were not able to be enhanced in a well-balanced manner.

The invention claimed is:

1. A pneumatic tire comprising a tread portion molded by a plurality of sectors divided in a tire circumferential direction, the pneumatic tire comprising:
   a plurality of circumferential grooves extending in the tire circumferential direction in the tread portion;
   a plurality of rows of land portions defined by the plurality of circumferential grooves; and
   a plurality of sipes extending in a tire width direction in at least one row of the plurality of rows of land portions,
   the plurality of sipes including at least one shallow bottom sipe and a plurality of regular sipes, the at least one shallow bottom sipe being disposed in a boundary region comprising a dividing position of each of the plurality of sectors, the plurality of regular sipes being disposed at positions more separated from the dividing position of each of the plurality of sectors than the at least one shallow bottom sipe, and the at least one shallow bottom sipe being shallower than the plurality of regular sipes; wherein
   an inclination angle of each of the plurality of sipes with respect to the dividing line of each of the plurality of sectors is defined as θ, a number of the shallow bottom sipes that satisfy $0° \leq \theta \leq 30°$ is larger than a number of the shallow bottom sipes that do not satisfy $0° \leq \theta \leq 30°$, the number of shallow bottom sipes that do not satisfy $0° \leq \theta \leq 30°$ being greater than 0.

2. The pneumatic tire according to claim 1, wherein the boundary region is a region within 15 mm on one side in the tire circumferential direction with the dividing position of each of the plurality of sectors as a center.

3. The pneumatic tire according to claim 1, wherein the at least one shallow bottom sipe has a depth in a range of from 30% to 80% to an average maximum depth of the plurality of regular sipes in each of the plurality of rows of land portions including the at least one shallow bottom sipe.

4. The pneumatic tire according to claim 2, wherein the at least one shallow bottom sipe has a depth in a range of from 30% to 80% to an average maximum depth of the plurality of regular sipes in each of the plurality of rows of land portions including the at least one shallow bottom sipe.

5. The pneumatic tire according to claim 1, wherein the shallow bottom sipes are disposed most in a shoulder land portion located on an outermost side in the tire width direction among the plurality of rows of land portions in the tread portion.

* * * * *